(12) United States Patent
Uchikawa (10) Patent No.: US 8,197,071 B2
(45) Date of Patent: Jun. 12, 2012

(54) LIGHT SOURCE DEVICE AND IMAGE DISPLAY APPARATUS

(75) Inventor: Daisuke Uchikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 436 days.

(21) Appl. No.: 12/487,160

(22) Filed: Jun. 18, 2009

(65) Prior Publication Data

US 2009/0323027 A1 Dec. 31, 2009

(30) Foreign Application Priority Data

Jun. 26, 2008 (JP) ................................. 2008-166921
Apr. 17, 2009 (JP) ................................. 2009-100612

(51) Int. Cl.
G03B 21/26 (2006.01)
G03B 21/28 (2006.01)
G02B 27/14 (2006.01)
H04N 9/07 (2006.01)
G01B 11/00 (2006.01)
F21S 8/06 (2006.01)

(52) U.S. Cl. .............. 353/31; 353/94; 353/99; 359/634; 348/339; 356/400; 362/408

(58) Field of Classification Search .................... 353/31, 353/94, 99; 359/634; 348/339; 356/400; 362/408

See application file for complete search history.

(56) References Cited

U.S. PATENT DOCUMENTS

| 6,945,652 | B2 | 9/2005 | Sakata et al. | |
| 7,878,658 | B2 * | 2/2011 | Hudman et al. | 353/38 |
| 2001/0022566 | A1 * | 9/2001 | Okazaki | 345/84 |

FOREIGN PATENT DOCUMENTS

JP    A-2003-21800    1/2003

* cited by examiner

Primary Examiner — Georgia Y Epps
Assistant Examiner — Magda Cruz
(74) Attorney, Agent, or Firm — Oliff & Berridge, PLC (57) ABSTRACT

A light source device includes: a light source section adapted to emit a light beam; a first optical element provided with a first entrance surface to which the light beam emitted from the light source section is input, and adapted to transmit the light beam; and a second optical element provided with a second entrance surface to which the light beam transmitted through the first optical element is input, and adapted to transmit the light beam, wherein the first entrance surface is tilted towards a direction rotated around a primary axis with respect to a principal ray of the light beam input to the first entrance surface, and the second entrance surface is tilted towards a direction rotated around a secondary axis substantially perpendicular to the primary axis with respect to the principal ray of the light beam input to the second entrance surface.

18 Claims, 8 Drawing Sheets

LIGHT SOURCE DEVICE AND IMAGE DISPLAY APPARATUS

BACKGROUND

1. Technical Field

The present invention relates to a technology for light source devices and image display apparatuses, and in particular for light source devices used in image display apparatuses for displaying images by scanning a light beam.

2. Related Art

In recent years, developments of projectors related to super-high image quality, downsizing, and reduction in power consumption have been in progress from a viewpoint of creating added value. Further, in association with high power and multi-color semiconductor lasers, developments of projectors and displays using laser sources have been activated. In comparison with the UHP lamps having been used as the light sources of projectors in the past, the laser sources have advantages of high color reproducibility, capability of quick lighting, long life, and so on. Further, the light sources have high luminous efficiency, can be composed of smaller number of optical elements with reduced energy loss, and therefore, are also suitable for low power consumption.

As the image display apparatus using the laser source, there can be cited an apparatus of scanning the laser beam, which is modulated in accordance with an image signal, in two-dimensional directions. In general, in order for displaying an image by scanning a laser beam, there is adopted a configuration in which a plurality of colored beams respectively emitted from different laser sources is combined into a single light beam, and a scanning optical system scans the single light beam (see, e.g., JP-A-2003-21800 (Document 1)). For example, as shown in FIG. 5 of the Document 1, by using a dichroic mirror as a parallel plate, a plurality of colored beams can be combined with a simple configuration. The laser beams are input to the dichroic mirrors, each of which is disposed at an angle of 45 degrees with the principal ray of the laser beam, from two directions, thereby combining the colored beam transmitted through the dichroic mirror and the colored beam reflected by the dichroic mirror with each other.

The laser sources emit laser beams slightly converged so as to form beam waists on the irradiated surface, for example, taking the influences of spread of the laser beams due to the diffraction into consideration. Thus, a spot having the area corresponding to that of the pixel is formed on the irradiated surface distant from the scanning optical system. If a diverging laser beam emitted from the laser source or a laser beam collected by a light collection optical system is transmitted through the parallel plate disposed at a tilt, the astigmatic difference is increased. The astigmatic difference denotes the distance between imaging positions in the case in which the imaging positions are shifted from each other in two directions perpendicular to each other. The increase in the astigmatic difference causes a problem of making it difficult to form a spot with a desired diameter on the irradiated surface, and to accurately adjust the focusing position to degrade the image quality.

SUMMARY

An advantage of some aspects of the present invention is to provide a light source device capable of reducing the astigmatic difference, and an image display apparatus using the light source device, thereby displaying a high quality image.

According to an aspect of the invention, a light source device includes a light source section adapted to emit a light beam, a first optical element provided with a first entrance surface to which the light beam emitted from the light source section is input, and adapted to transmit the light beam input to the first entrance surface, and a second optical element provided with a second entrance surface to which the light beam transmitted through the first optical element is input, and adapted to transmit the light beam input to the second entrance surface, the first entrance surface is tilted towards a direction rotated around a primary axis with respect to a principal ray of the light beam input to the first entrance surface, and the second entrance surface is tilted towards a direction rotated around a secondary axis substantially perpendicular to the primary axis with respect to the principal ray of the light beam input to the second entrance surface.

The first optical element and the second optical element generate astigmatic differences in the directions perpendicular to each other, thereby compensating the astigmatic differences with each other. By adjusting the tilt of at least one of the first entrance surface and the second entrance surface, the astigmatic difference caused in the light source device is reduced. Thus, the light source device capable of reducing the astigmatic difference can be obtained.

Further, in another preferable aspect of the invention, it is desirable that the first optical element is a parallel plate adapted to transmit the light beam input to the first entrance surface. Thus, by appropriately adjusting the tilt of the first optical element, the astigmatic difference caused in the second optical element can be reduced.

Further, in another preferable aspect of the invention, it is desirable that the second optical element is a parallel plate adapted to transmit the light beam input to the second entrance surface, and a thickness of the first optical element is substantially the same as a thickness of the second optical element. Thus, the configuration in which the first optical element and the second optical element cancel each other's astigmatic difference can be obtained.

Further, in another preferable aspect of the invention, it is desirable that the second optical element is a parallel plate adapted to transmit the light beam input to the second entrance surface, and an angle between the first entrance surface and the principal ray with respect to the direction rotated around the primary axis is substantially the same as an angle between the second entrance surface and the principal ray with respect to the direction rotated around the secondary axis. Thus, the configuration in which the first optical element and the second optical element cancel each other's astigmatic difference can be obtained.

Further, in another preferable aspect of the invention, it is desirable that a first light source section as the light source section adapted to input a first light beam to the first optical element, and a second light source section adapted to input a second light beam to the second optical element are provided, and the second optical element transmits the first light beam emitted from the first light source section and then transmitted through the first optical element, and reflects the second light beam emitted from the second light source section and then input to a surface opposite to the second entrance surface, thereby combining the first light beam and the second light beam. Thus, it becomes possible to reduce the astigmatic difference caused by the configuration for combining the light beams from different light source sections.

Further, in another preferable aspect of the invention, it is desirable that a converging optical system disposed on an exit side of the second optical element, and adapted to converge the first light beam and the second light beam is provided. By using the converging optical system common to the respective light beams, the light source device can emit the converged light beams with a small-sized and simple configuration with a smaller number of components.

Further, in another preferable aspect of the invention, it is desirable that the first light beam is a first colored light beam, the second light beam is a second colored light beam, and the second optical element is a dichroic mirror adapted to transmit the first colored light beam and to reflect the second colored light beam. Thus, a plurality of colored light beams can be combined into a single light beam.

Further, in another preferable aspect of the invention, a third light source section adapted to emit a third colored light beam, and a dichroic mirror adapted to transmit the first colored light beam and the second colored light beam, and to reflect the third colored light beam are provided. Thus, the first colored light beam, the second colored light beam, and the third colored light beam can be combined.

Further, in another preferable aspect of the invention, it is desirable that a light detection section adapted to detect a light beam reflected on the first entrance surface is provided, and the light intensity of the light beam emitted from the light source section is controlled based on the result of detection by the light detection section. Thus, the light beam with stable light intensity can be emitted effectively using the light beam reflected by the first entrance surface.

Further, in another preferable aspect of the invention, it is desirable that a first light source section adapted to emit a first colored light beam, a second light source section adapted to emit a second colored light beam, and a second colored light beam splitting section adapted to split the second colored light beam emitted from the second light source section are provided, the first colored light beam is split using the first optical element, and the second color beam splitting section is provided with an entrance surface substantially perpendicular to a principal ray of the second colored light beam. Thus, the configuration of inputting a part of the second colored light beam to the light detection section without increasing the astigmatic difference can be obtained.

Further, according to another aspect of the invention, a light source device includes a light source section adapted to emit a light beam, a first optical element provided with a first entrance surface to which the light beam emitted from the light source section is input, and adapted to transmit the light beam input to the first entrance surface, a second optical element provided with a second entrance surface to which the light beam transmitted through the first optical element is input, and adapted to transmit the light beam input to the second entrance surface, and a holding section adapted to hold the first optical element to define an angle between the first entrance surface and a principal ray of the light beam input to the first entrance surface, the first entrance surface is tilted towards a direction rotated around a primary axis with respect to a principal ray of the light beam input to the first entrance surface, and the second entrance surface is tilted towards a direction rotated around a secondary axis substantially perpendicular to the primary axis with respect to the principal ray of the light beam input to the second entrance surface.

The tilt of the first optical element is adjusted so as to reduce the astigmatic difference caused in the second optical element. The holding section holds the first optical element with the tilt adjusted. Thus, the configuration of reducing the astigmatic difference can be realized.

Further, in another preferable aspect of the invention, it is desirable that a fixing section adapted to fix the first optical element with the angle between the first entrance surface and the principal ray of the light beam input to the first entrance surface adjusted is provided. Thus, the first optical element can be held in a condition of reducing the astigmatic difference.

Further, in another preferable aspect of the invention, it is desirable that a substrate to which the holding section is installed, and a tilt adjusting section adapted to adjust a tilt of the holding section with respect to the substrate is provided. By adjusting the tilt of the holding section by the tilt adjusting section, the angle between the first entrance surface and the principal ray of the light beam can be adjusted.

Further, in another preferable aspect of the invention, it is desirable that a tilt adjusting section adapted to adjust a tilt of the first optical element with respect to the holding section is provided. By adjusting the tilt of the first optical element by the tilt adjusting section, the angle between the first entrance surface and the principal ray of the light beam can be adjusted.

Further, according to another aspect of the invention, an image display apparatus includes the light source device described above adapted to emit a light beam, and a scanning optical system adapted to scan the light beam emitted from the light source device, and an image is displayed by the scanning optical system scanning the light beam. By using the light source device described above, it becomes possible to reduce the astigmatic difference, thereby forming the spot with a desired diameter, and accurately adjusting the focusing position. Thus, the image display apparatus capable of displaying a high-quality image can be obtained.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, embodiments of the invention will be described in detail with reference to the accompanying drawings.

First Embodiment

Figure 1:
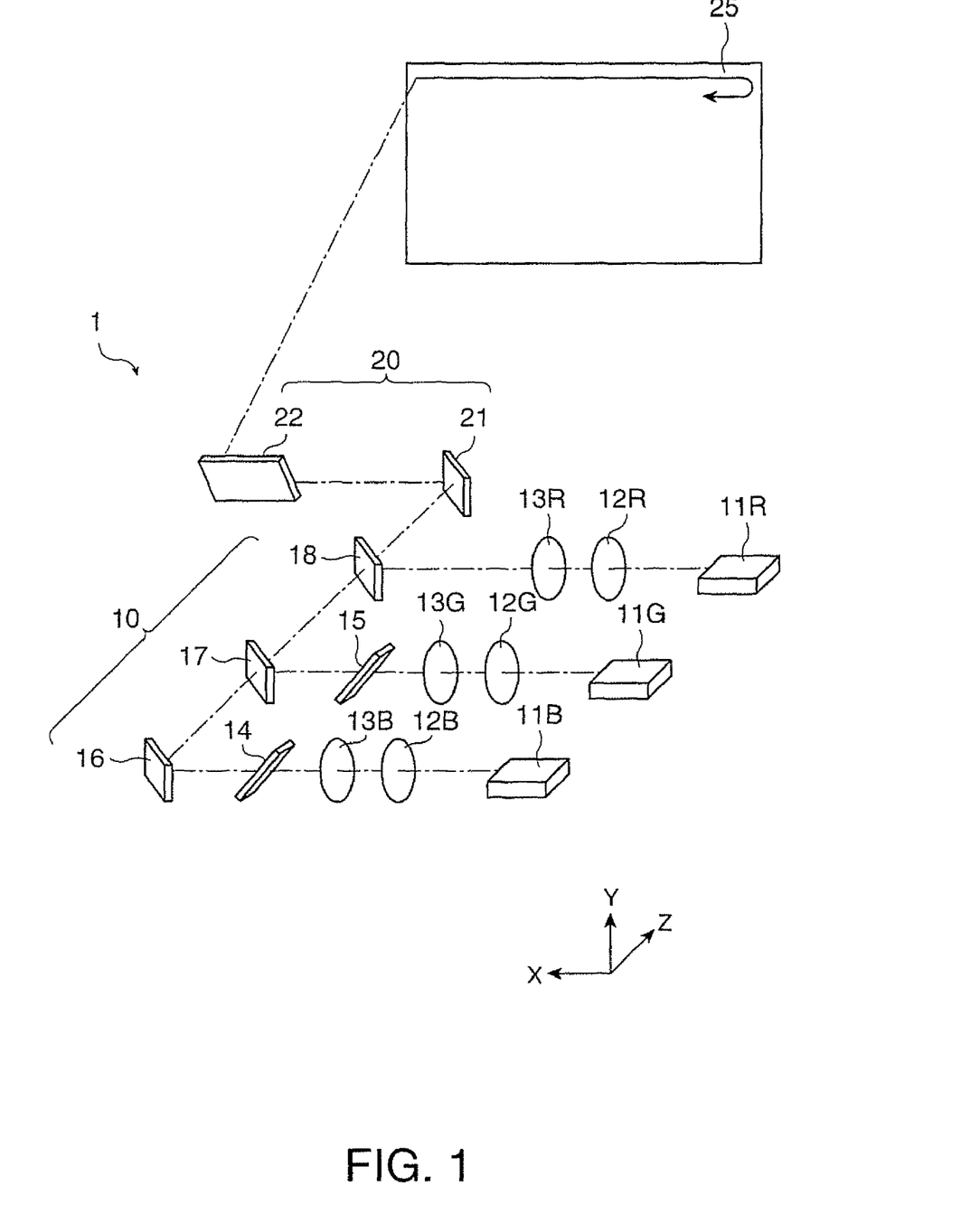
FIG. 1 is a diagram showing a schematic configuration of an image display apparatus according to a first embodiment of the invention.

FIG. 1 shows a schematic configuration of an image display apparatus 1 according to a first embodiment of the invention. The image display device 1 scans a laser beam modulated in accordance with an image signal, thereby displaying an image. The image display apparatus 1 has a light source device 10 for combining a plurality of colored light beams into a single light beam and emitting the combined light beam and a scanning optical system 20 for scanning the colored light beams emitted from the light source device 10. A blue (B) light semiconductor laser 11B, a green (G) light semiconductor laser 11G, and a red (R) light semiconductor laser 11R provided to the light source device 10 are light source sections for emitting laser beams as the light beams. In the drawing, the direction along which the light source device 10 emits the laser beams is defined as a Z-axis direction. An X-axis is an axis perpendicular to the Z-axis. A Y-axis is an axis perpendicular to both of the Z-axis and the X-axis.

The B light semiconductor laser 11B emits the B light, which is modulated in accordance with an image signal, in the X-axis direction. As the modulation in accordance with the image signal, either one of the amplitude modulation and the pulse width modulation can be used. The collimator optical system 12B collimates the B light from the B light semiconductor laser 11B. A converging optical system 13B converges the B light having been collimated by the collimator optical system 12B, thereby forming a beam waist in the vicinity of the irradiated surface of the screen 25. The collimator optical system 12B and the converging optical system 13B can be made as a common optical system having both of a collimating function and a converging function.

A correcting parallel plate 14 transmits the B light from the converging optical system 13B. The correcting parallel plate 14 is a parallel plate made of a transparent member, for example, glass, and is provided for correction of astigmatic difference with respect to the B light. A B light reflecting mirror 16 reflects the B light transmitted through the correcting parallel plate 14. The B light reflecting mirror 16 is composed by forming a highly reflecting member for reflecting the B light such as a dielectric multilayer film on a substrate. The B light is bent roughly 90 degrees in the light path by the reflection on the B light reflecting mirror 16, and is converted in the proceeding direction from the X-axis direction to the Z-axis direction.

The G light semiconductor laser 11G emits the G light, which is modulated in accordance with an image signal, in the X-axis direction. The collimator optical system 12G collimates the G light from the G light semiconductor laser 11G. A converging optical system 13G converges the G light having been collimated by the collimator optical system 12G, thereby forming a beam waist in the vicinity of the irradiated surface of the screen 25. The collimator optical system 12G and the converging optical system 13G can be made as a common optical system having both of a collimating function and a converging function.

A correcting parallel plate 15 transmits the G light from the converging optical system 13G. The correcting parallel plate 15 is a parallel plate made of a transparent member, for example, glass, and is provided for correction of astigmatic difference with respect to the G light. A dichroic mirror 17 is disposed at a position where the G light from the correcting parallel plate 15 and the B light from the B light reflecting mirror 16 enter. The dichroic mirror 17 transmits the B light and reflects the G light, thereby combining the B light and the G light. The G light is bent roughly 90 degrees in the light path by the reflection on the dichroic mirror 17, and is converted in the proceeding direction from the X-axis direction to the Z-axis direction. The dichroic mirror 17 is composed by forming a wavelength selection film such as a dielectric multilayer film on a parallel plate made of a transparent material such as glass.

The R light semiconductor laser 11R emits the R light, which is modulated in accordance with an image signal, in the X-axis direction. The collimator optical system 12R collimates the R light from the R light semiconductor laser 11R. A converging optical system 13R converges the R light having been collimated by the collimator optical system 12R, thereby forming a beam waist in the vicinity of the irradiated surface of the screen 25. The collimator optical system 12R and the converging optical system 13R can be made as a common optical system having both of a collimating function and a converging function.

The dichroic mirror 18 is disposed at a position where the R light from the converging optical system 13R and the B light and the G light, which are combined by the dichroic mirror 17, enter. The dichroic mirror 18 transmits the B light and the G light and reflects the R light, thereby combining the B light, the G light, and the R light. The R light is bent roughly 90 degrees in the light path by the reflection on the dichroic mirror 18, and is converted in the proceeding direction from the X-axis direction to the Z-axis direction. The dichroic mirror 18 is composed by forming a wavelength selection film such as a dielectric multilayer film on a parallel plate made of a transparent material such as glass. The light source device 10 uses the two dichroic mirrors 17, 18, thereby combining the colored light beams into a single light beam.

The scanning optical system 20 is provided with a first scanning section 21 and a second scanning section 22. The first scanning section 21 scans the light beam in a first scan direction. The first scan direction is, for example, a horizontal direction. The second scanning section 22 scans the light beam in a second scan direction. The second scan direction is a direction perpendicular to the first scan direction, and for example, is a vertical direction. The first scanning section 21 and the second scanning section 22 scan the light beam in two-dimensional directions on the irradiated surface of the screen 25.

The first scanning section 21 and the second scanning section 22 each scan the laser beam using a movable mirror turning around a rotational axis. The first scanning section 21 is, for example, an MEMS mirror formed using the MEMS technology. The second scanning section 22 is, for example, a galvanometer mirror. It is enough for the scanning optical system 20 to scan the light beam in two-dimensional directions, and the scanning optical system 20 is not limited to what is explained in the present embodiment. The scanning optical system 20 can also be, for example, what uses a polygon mirror, or what uses a movable mirror turning around two rotational axes perpendicular to each other.

Figure 2:
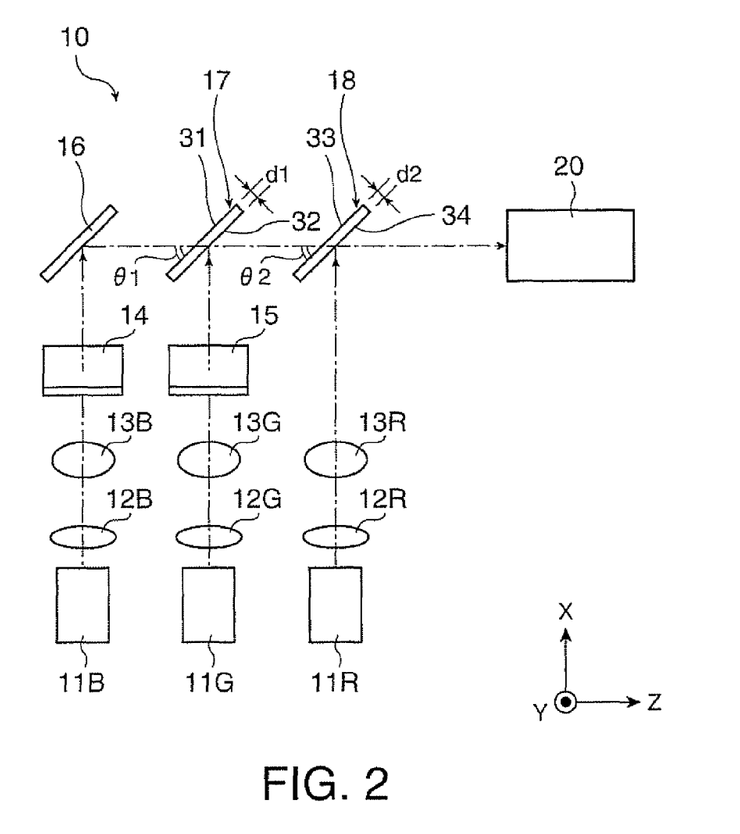
FIG. 2 is a diagram showing a top view configuration of a light source device and a scanning optical system shown in FIG. 1.

FIG. 2 shows a top view configuration of the light source device 10 and the scanning optical system 20 shown in FIG. 1. The dichroic mirror 17 has a first surface 31 to which the B light from the B light reflecting mirror 16 is input, and a second surface 32 opposite to the first surface 31. The dichroic mirror 17 transmits the laser beam input to the first surface 31 and output it from the second surface 32. In the X-Z plane shown in the drawing, the angle θ1 between the principal ray of the B light input to the first surface 31 and the first surface 31 is roughly 45 degrees.

The dichroic mirror 17 is tilted towards a direction rotated around a secondary axis substantially parallel to the Y-axis with respect to the principal ray of the B light entering the first surface 31. The G light from the correcting parallel plate 15 is reflected on the second surface 32 of the dichroic mirror 17. The principal ray of the B light entering the first surface 31 and the principal ray of the G light entering the second surface 32 are substantially perpendicular to each other. The principal ray of the G light is bent roughly 90 degrees by the reflection on the second surface 32, and is then combined with the principal ray of the B light transmitted through the dichroic mirror 17. It should be noted that it is preferable to provide an anti-reflection film (an AR coat) for preventing reflection of the B light on the first surface 31.

The dichroic mirror 18 has a first surface 33 to which the B light and the G light from the dichroic mirror 17 are input, and a second surface 34 opposite to the first surface 33. The dichroic mirror 18 transmits the laser beam input to the first surface 33 and outputs it from the second surface 34. In the X-Z plane shown in the drawing, the angle θ2 between the principal rays of the B light and the G light input to the first surface 33 and the first surface 33 is roughly 45 degrees.

The dichroic mirror 18 is tilted towards a direction rotated around a secondary axis substantially parallel to the Y-axis with respect to the principal rays of the B light and the G light entering the first surface 33. The R light from the converging optical system 13R is reflected on the second surface 34 of the dichroic mirror 18. The principal rays of the B light and the G light entering the first surface 33 and the principal ray of the R light entering the second surface 34 are substantially perpendicular to each other. The principal ray of the R light is bent roughly 90 degrees by the reflection on the second surface 34, and is then combined with the principal rays of the B light and the G light transmitted through the dichroic mirror 18. It should be noted that it is preferable to provide an AR coat for preventing reflection of the B light and the G light on the first surface 33.

Figure 3:
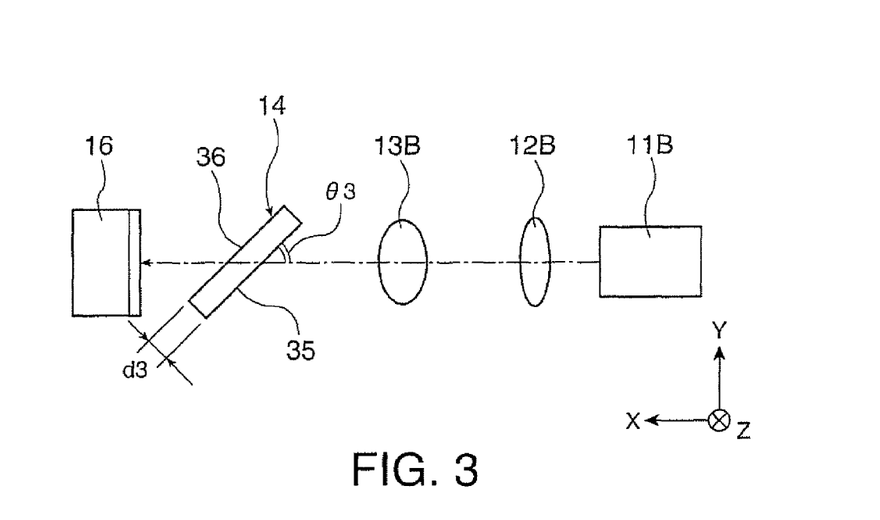
FIG. 3 is a diagram showing a side view configuration of the constituents disposed on a light path of a B light.

FIG. 3 shows a side view configuration of the elements disposed on the light path from the B light semiconductor laser 11B to the B light reflecting mirror 16 in the light source device 10. The correcting parallel plate 14 has a first surface 35 to which the B light from the converging optical system 13B is input, and a second surface 36 opposite to the first surface 35. The correcting parallel plate 14 transmits the laser beam input to the first surface 35 and outputs it from the second surface 36. In the X-Y plane shown in the drawing, the angle θ3 between the principal ray of the B light input to the first surface 35 and the first surface 35 is roughly 45 degrees. The correcting parallel plate 14 is tilted towards a direction rotated around a primary axis substantially parallel to the Z-axis with respect to the principal ray of the B light entering the first surface 35. It should be noted that it is preferable to provide an AR coat for preventing reflection of the B light on each of the first surface 35 and the second surface 36.

The B light from the B light semiconductor laser 11B is input obliquely to both of the first surface 31 of the dichroic mirror 17 and the first surface 33 of the dichroic mirror 18. The transmission of the laser beam converged by the converging optical system 13B through the dichroic mirror 17 and the dichroic mirror 18 leads to movement of a focal position with respect to the beam diameter along the X-axis direction. The correcting parallel plate 14 is disposed tilted towards a direction rotated around the primary axis perpendicular to the secondary axis with respect to the dichroic mirrors 17, 18, which are tilted towards the direction rotated around the secondary axis. By making the laser beam converged by the converging optical system 13B be transmitted through the correcting parallel plate 14, the focal position with respect to the beam diameter along the Y-axis direction is moved.

Focusing attention on the B light from the B light semiconductor laser 11B, the correcting parallel plate 14 functions as a first optical element provided with the first surface 35 as a first entrance surface. The dichroic mirror 17 and the dichroic mirror 18 function as second optical elements provided with the first surfaces 31, 33 as second entrance surfaces, respectively. The B light semiconductor laser 11B functions as a first light source section for making the B light as first colored light enter the first optical element. The G light semiconductor laser 11G functions as a second light source section for making the G light as second colored light enter the second optical element. The R light semiconductor laser 11R functions as a third light source section for emitting the R light as third colored light.

The angle θ3 between the first surface 35 of the correcting parallel plate 14 and the principal ray, the angle θ1 between the first surface 31 of the dichroic mirror 17 and the principal ray, and the angle θ2 between the first surface 33 of the dichroic mirror 18 and the principal ray are substantially the same as each other. The thickness d3 of the correcting parallel plate 14 is substantially identical to a thickness obtained by adding the thickness d1 of the dichroic mirror 17 and the thickness d2 of the dichroic mirror 18.

By setting the thickness d3 and the tilt of the correcting parallel plate 14 as described above, the amount of movement of the focal position with respect to the beam diameter along the X-axis direction by the dichroic mirrors 17, 18 and the amount of movement of the focal position with respect to the beam diameter along the Y-axis direction by the correcting parallel plate 14 are made substantially identical to each other. By canceling the astigmatic difference, which is caused by the dichroic mirrors 17, 18, by the correcting parallel plate 14, the astigmatic difference with respect to the B light can be reduced.

Figure 4:
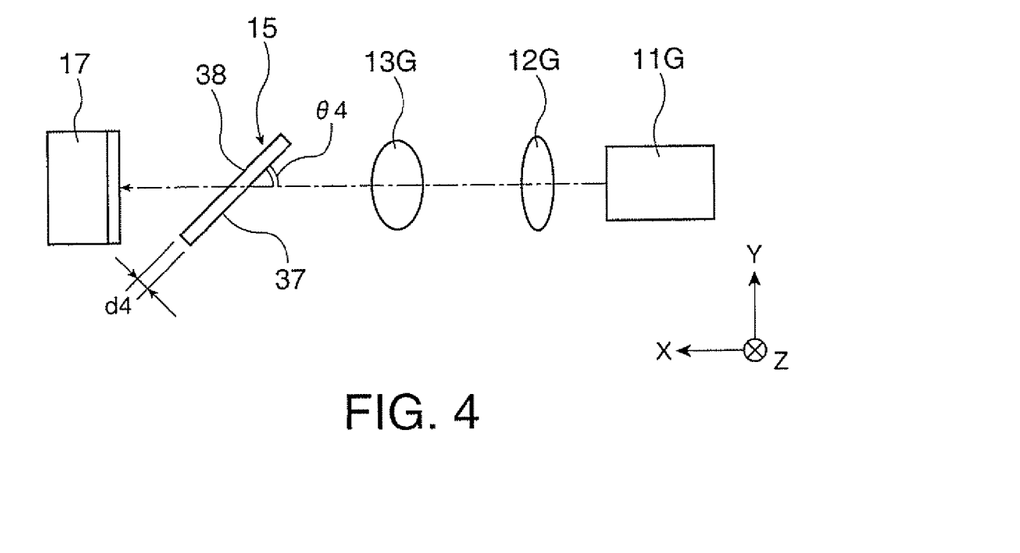
FIG. 4 is a diagram showing a side view configuration of the constituents disposed on a light path of a G light.

FIG. 4 shows a side view configuration of the elements disposed on the light path from the G light semiconductor laser 11G to the dichroic mirror 17 in the light source device 10. The correcting parallel plate 15 has a first surface 37 to which the G light from the converging optical system 13G is input, and a second surface 38 opposite to the first surface 37. The correcting parallel plate 15 transmits the laser beam input to the first surface 37 and outputs it from the second surface 38. In the X-Y plane shown in the drawing, the angle θ4 between the principal ray of the G light input to the first surface 37 and the first surface 37 is roughly 45 degrees. The correcting parallel plate 15 is tilted towards a direction rotated around a primary axis substantially parallel to the Z-axis with respect to the principal ray of the G light entering the first surface 37. It should be noted that it is preferable to provide an AR coat for preventing reflection of the G light on each of the first surface 37 and the second surface 38.

The G light from the G light semiconductor laser 11G obliquely enters the first surface 33 of the dichroic mirror 18. By making the laser beam converged by the converging optical system 13G be transmitted through the dichroic mirror 18, the focal position with respect to the beam diameter along the X-axis direction is moved. The correcting parallel plate 15 is disposed tilted towards a direction rotated around the primary axis perpendicular to the secondary axis with respect to the dichroic mirror 18, which is tilted towards the direction rotated around the secondary axis. By making the laser beam converged by the converging optical system 13G be transmitted through the correcting parallel plate 15, the focal position with respect to the beam diameter along the Y-axis direction is moved.

Focusing attention on the G light from the G light semiconductor laser 11G, the correcting parallel plate 15 functions as a first optical element provided with the first surface 37 as a first entrance surface. The dichroic mirror 18 functions as a second optical element provided with the first surface 33 as a second entrance surface. The G light semiconductor laser 11G functions as a first light source section for making the G light as first colored light enter the first optical element. The R light semiconductor laser 11R functions as a second light source section for making the R light as second colored light enter the second optical element.

The angle θ4 between the first surface 37 of the correcting parallel plate 15 and the principal ray and the angle θ2 between the first surface 33 of the dichroic mirror 18 and the principal ray are substantially identical to each other. The thickness d4 of the correcting parallel plate 14 is substantially identical to the thickness d2 of the dichroic mirror 18. By setting the thickness d4 and the tilt of the correcting parallel plate 15 as described above, the amount of movement of the focal position with respect to the beam diameter along the X-axis direction by the dichroic mirror 18 and the amount of movement of the focal position with respect to the beam diameter along the Y-axis direction by the correcting parallel plate 15 are made substantially identical to each other. By canceling the astigmatic difference, which is caused by the dichroic mirrors 18, by the correcting parallel plate 15, the astigmatic difference with respect to the G light can also be reduced. Since the optical element to which the R light is obliquely input and through which the R light is transmitted is not provided to the light source device 10, it is not required to consider generation of the astigmatic difference due to the transmission through the optical element with respect to the R light. Therefore, there is no need for providing the correction parallel plate with respect to the R light.

As described above, the first optical element and the second optical element generate astigmatic differences in the directions perpendicular to each other, thereby compensating the astigmatic differences with each other. Thus, the advantage that the astigmatic differences can be reduced is obtained. Since it becomes possible to form a spot with desired diameter and to accurately adjust the focusing position by reducing the astigmatic differences, the image display apparatus 1 becomes capable of displaying a high quality image.

The correcting parallel plates 14, 15 can be those correcting the astigmatic differences including the movement of the focal position caused not only by the dichroic mirrors 17, 18 but also by other elements. As the astigmatic difference caused by other elements, there can be cited, for example, the astigmatic difference of the light source device caused by an astigmatic difference inherent in an edge-emitting semiconductor laser. Further, also in the light path of the R light, it is possible to dispose a parallel plate between the converging optical system 13R and the dichroic mirror 18 if it is necessary to correct the movement of the focal position due to other elements. It is also possible to appropriately adjust the tilts and the thicknesses of the correcting parallel plates 14, 15 in accordance with conditions of the optical elements disposed on the light path of the laser beam. It is also possible to appropriately modify the arrangement of the semiconductor lasers 11B, 11G, 11R for the respective colored light in the light source device 10. For example, it is also possible to dispose the B light semiconductor laser 11B in an orientation of emitting the B light in the Z-axis direction, thereby eliminating the B light reflecting mirror 16. Further, it is also possible to interchange the semiconductor lasers 11B, 11G, 11R for the respective colored light with each other. The transmission/reflection characteristics of the dichroic mirrors 17, 18 can appropriately be set in accordance with the arrangement of the semiconductor lasers 11B, 11G, 11R for the respective colored light.

It is enough for the correcting parallel plate 14 to be disposed on the light path between the B light semiconductor laser 11B and the dichroic mirror 17, and in particular it is preferable for the correcting parallel plate 14 to be disposed between the converging optical system 13B and the dichroic mirror 17. It is enough for the correcting parallel plate 15 to be disposed on the light path between the G light semiconductor laser 11G and the dichroic mirror 18, and in particular it is preferable for the correcting parallel plate 15 to be disposed between the converging optical system 13G and the dichroic mirror 18.

Figure 5:
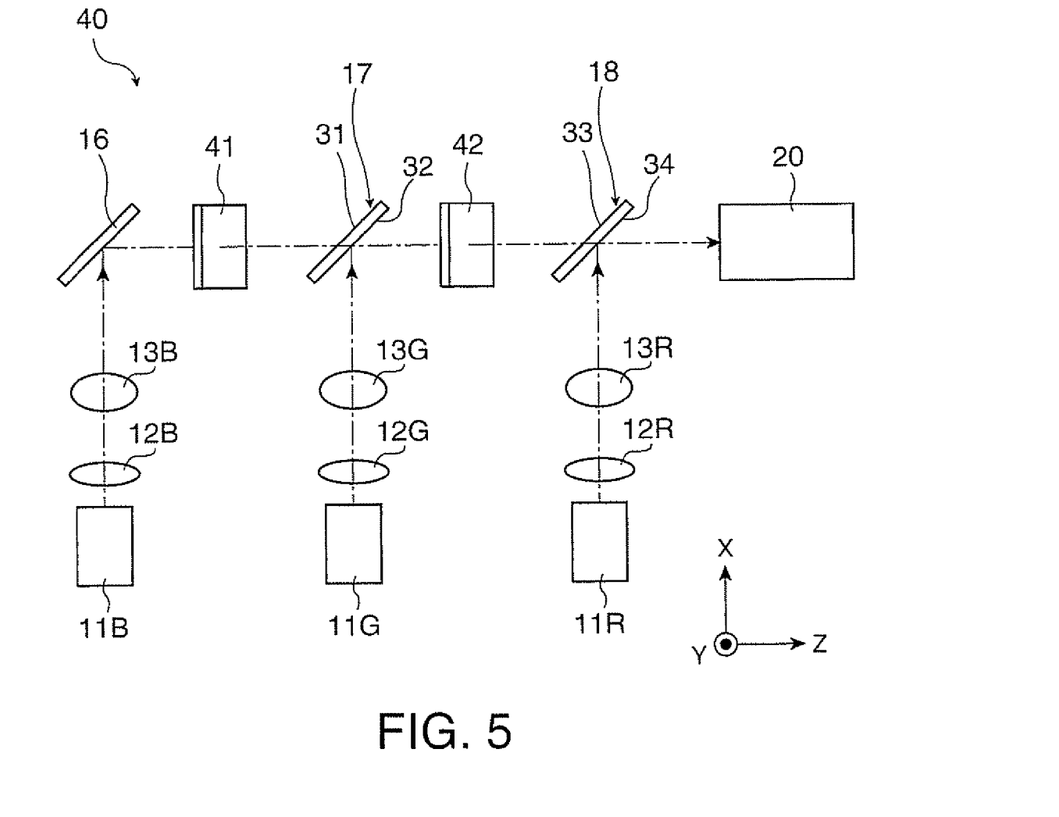
FIG. 5 is a diagram showing a top view configuration of a light source device and a scanning optical system according to a modified example of the first embodiment.

FIG. 5 shows a top view configuration of the light source device 40 and the scanning optical system 20 according to a modified example of the present embodiment. In the present modified example, correcting parallel plates 41, 42 are disposed respectively on the light path between the B light reflecting mirror 16 and the dichroic mirror 17 and the light path between the dichroic mirror 17 and the dichroic mirror 18. The correcting parallel plates 41, 42 are parallel plates formed from a transparent material such as glass. The correcting parallel plate 41 is used for correcting the astigmatic difference with respect to the G light. The correcting parallel plate 42 is used for correcting the astigmatic difference with respect to the G light and the B light.

The correcting parallel plate 41 is tilted towards a direction rotated around a primary axis substantially parallel to the X-axis with respect to the principal ray of the B light entering the first surface of the correcting parallel plate 41. The angle between the first surface of the correcting parallel plate 41 and the principal ray, the angle between the first surface 31 of the dichroic mirror 17 and the principal ray, and the angle between the first surface 33 of the dichroic mirror 18 and the principal ray are substantially the same as each other. The thickness of the correcting parallel plate 41 is substantially identical to the thickness of the dichroic mirror 17. It should be noted that in the case of the light source device 10 described above, due to the bending of the light path in the B light reflecting mirror 16, the primary axis of the correcting parallel plate 14 is converted to have a direction substantially parallel to the Z-axis. Assuming the case in which the bending of the light path in the B light reflecting mirror 16 is eliminated, the direction of the primary axis is identical between the light source device 10 described above and the light source device 40 according to the present modified example.

The correcting parallel plate 42 is tilted towards a direction rotated around a primary axis substantially parallel to the X-axis with respect to the principal rays of the B light and the G light entering the first surface of the correcting parallel plate 42. The angle between the first surface of the correcting parallel plate 42 and the principal ray, the angle between the first surface 31 of the dichroic mirror 17 and the principal ray, and the angle between the first surface 33 of the dichroic mirror 18 and the principal ray are substantially the same as each other. The thickness of the correcting parallel plate 42 is substantially identical to the thickness of the dichroic mirror 17, it should be noted that in the case of the light source device 10 described above, due to the bending of the light path in the dichroic mirror 17, the primary axis of the correcting parallel plate 15 is converted to a direction substantially parallel to the Z-axis. In the case of the present modified example, the astigmatic difference can be reduced using the correcting parallel plates 41, 42 formed with substantially the same thickness.

Second Embodiment

Figure 6:
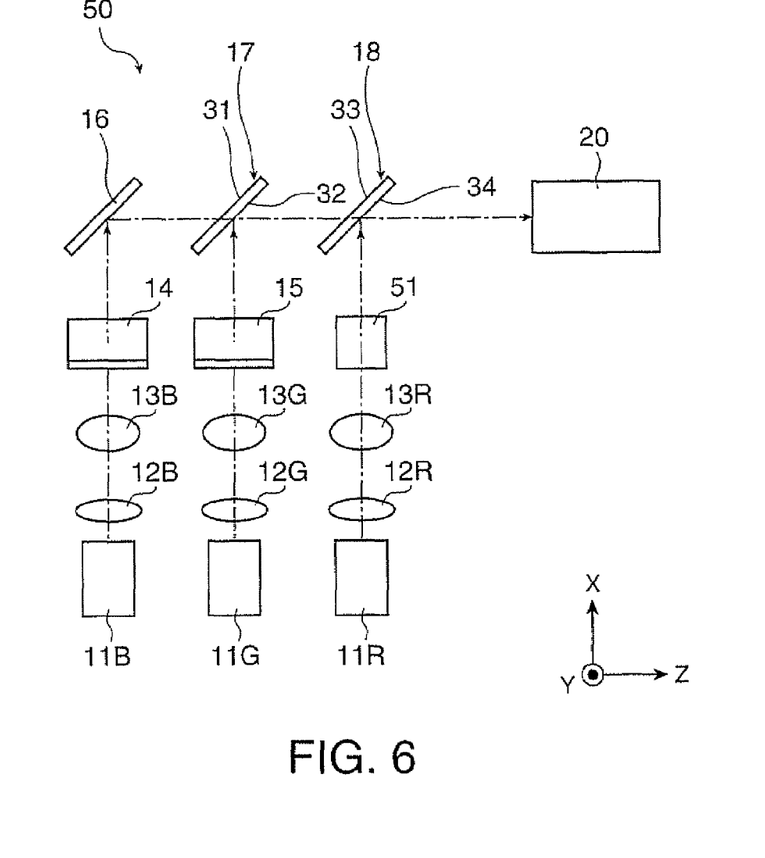
FIG. 6 is a diagram showing a top view configuration of a light source device and a scanning optical system according to a second embodiment of the invention.

FIG. 6 shows a top view configuration of a light source device 50 and the scanning optical system 20 according to a second embodiment of the invention. The light source device 50 according to the present embodiment is applied to the image display apparatus 1 of the first embodiment described above. In the present embodiment, automatic power control (APC) of the light source section is performed using the light reflected on the correcting parallel plates 14, 15. The same parts as in the first embodiment are denoted with the same reference numerals, and the duplicated explanations will be omitted. Further, the light source device 50 according to the present embodiment is provided with an R light beam splitter 51 disposed on the light path between the converging optical system 13R and the dichroic mirror 18.

Figure 7:
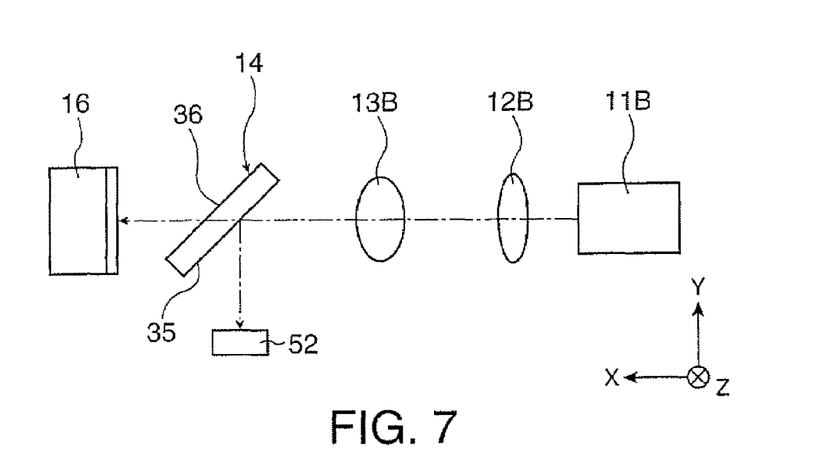
FIG. 7 is a diagram showing a side view configuration of the constituents disposed on a light path of a B light and a light detection section.

FIG. 7 shows a side view configuration of the elements disposed on the light path from the B light semiconductor laser 11B to the B light reflecting mirror 16 and a light detection section 52 in the light source device 50. The correcting parallel plate 14 reflects a part of the light, which enters the first surface 35, by the first surface 35, and transmits another part thereof. The correcting parallel plate 14 functions as a beam splitter for branching a part of the light from the converging optical system 13B in the direction towards the light detection section 52, in addition to correcting the astigmatic difference with respect to the B light. By eliminating the AR coat on the first surface 35, the correcting parallel plate 14 can have a configuration of surface-reflecting a small part of the light having entered the first surface 35, and transmitting most part of the light having entered the first surface 35. The light detection section 52 is disposed at a position where the light reflected by the first surface 35 enters. The light detection section 52 detects the light reflected by the first surface 35.

Figure 8:
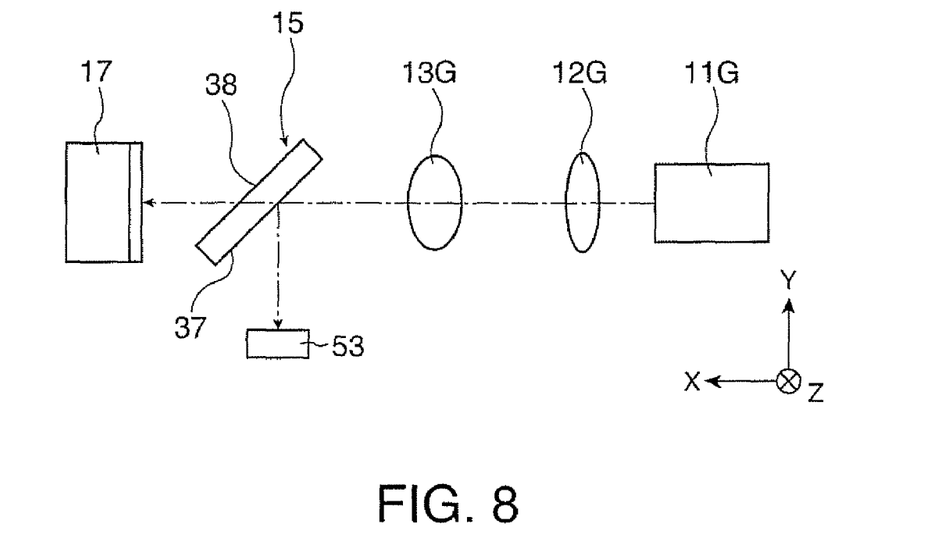
FIG. 8 is a diagram showing a side view configuration of the constituents disposed on a light path of a G light and a light detection section.

FIG. 8 shows a side view configuration of the elements disposed on the light path from the G light semiconductor laser 11G to the dichroic mirror 17 and the light detection section 53 in the light source device 50. The correcting parallel plate 15 reflects a part of the light, which enters the first surface 37, by the first surface 37, and transmits another part thereof. The correcting parallel plate 15 functions as a beam splitter for branching a part of the light from the converging optical system 13G in the direction towards the light detection section 53, in addition to correcting the astigmatic difference with respect to the G light. By eliminating the AR coat on the first surface 37, the correcting parallel plate 15 can have a configuration of surface-reflecting a small part of the light having entered the first surface 37, and transmitting most part of the light having entered the first surface 37. The light detection section 53 is disposed at a position where the light reflected by the first surface 37 enters. The light detection section 53 detects the light reflected by the first surface 37.

Figure 9:
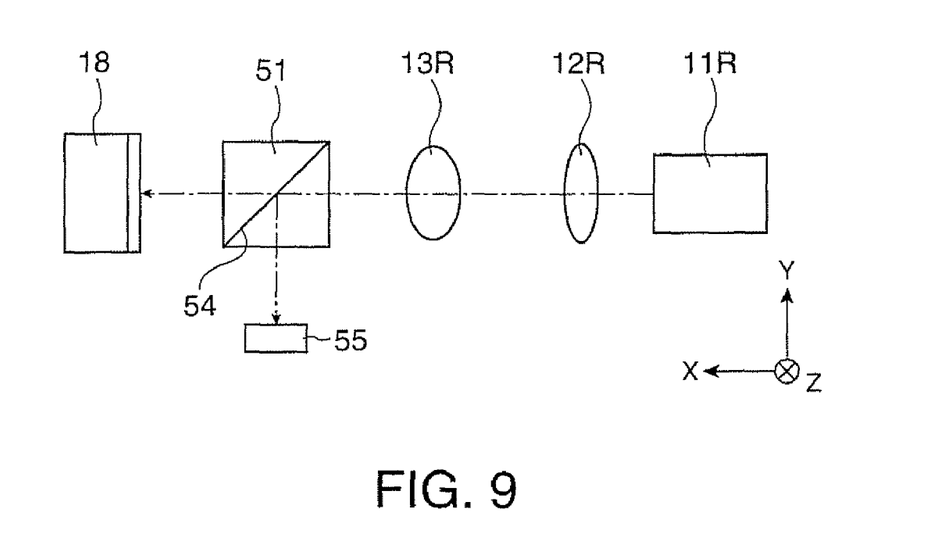
FIG. 9 is a diagram showing a side view configuration of the constituents disposed on a light path of an R light and a light detection section.

FIG. 9 shows a side view configuration of the elements disposed on the light path from the R light semiconductor laser 11R to the dichroic mirror 18 and the light detection section 55 in the light source device 50. The R light beam splitter 51 functions as a second colored light split section for splitting the R light as the second colored light emitted from the R light semiconductor laser 11R as the second light source section. The R light beam splitter 51 has a dielectric multilayer film 54 formed on the bonding surface of two rectangular prisms. The dielectric multilayer film 54 is disposed at an angle of about 45 degrees with the principal ray of the R light from the converging optical system 13R. The R light beam splitter 51 reflects a part of the light, which has been input thereto from the converging optical system 13R, by the dielectric multilayer film 54, and transmits another part thereof.

By using the R light beam splitter 51 provided with an entrance surface and an exit surface substantially perpendicular to the principal ray of the R light from the converging optical system 13R, it becomes possible to have a configuration of inputting a part of the R light to the light detection section 55 without increasing the astigmatic difference. The light detection section 55 is disposed at a position where the light reflected by the dielectric multilayer film 54 enters. The light detection section 55 detects the light branched by the R light beam splitter 51. It should be noted that the light detection sections 52, 53, 55 described above are each configured using a light receiving element, such as a photodiode, for converting the incident light into an electronic signal.

Going back to FIG. 6, the light source device 50 or the image display apparatus 1 equipped with the light source device 50 is provided with a control section not shown for controlling drive of the semiconductor lasers 11B, 11G, 11R of the respective colored light. The control section executes feedback control on the B light semiconductor laser 11B based on the detection result of the light detection section 52 for detecting the B light. Further, the control section executes feedback control on the G light semiconductor laser 11G based on the detection result of the light detection section 53 for detecting the G light. Still further, the control section executes feedback control on the R light semiconductor laser 11R based on the detection result of the light detection section 55 for detecting the R light. The light intensity of the laser beam emitted from each of the semiconductor lasers 11B, 11G, 11R for the respective colored light is stabilized by the APC.

Thus, the light source device 50 according to the present embodiment becomes capable of emitting the laser beams with the stabilized light intensity by effectively using the light reflected by the first surfaces 35, 37 of the correcting parallel plates 14, 15, in addition to reducing the astigmatic difference. By stabilizing the light intensity of each of the colored light beams, the image display apparatus 1 can display a high-quality image with a preferable color balance.

The light source device 50 is not limited to what corrects the astigmatic differences, which are caused by the dichroic mirrors 17, 18, with the correcting parallel plates 14, 15 functioning as the first optical elements. It is also possible to correct the astigmatic differences, which are caused by the parallel plates as the first optical elements provided to guide the light beams to the light detection sections 52, 53, using the dichroic mirrors 17, 18 functioning as the second optical elements. The first optical element and the second optical element are only required to compensate each other's astigmatic difference, and reduction of the astigmatic difference caused in the light source device 50 can be achieved by adjusting the tilt of at least one of the first entrance surface of the first optical element and the second entrance surface of the second optical element. The first optical element and the second optical element can correspond to either one of optical elements transmitting the light having been input thereto with the principal ray tilted with respect to the entrance surface thereof. Further, in the case in which the astigmatic difference caused by other elements with respect to the R light is corrected, a parallel plate without the AR coat provided on the entrance surface can also be used instead of the R light beam splitter 51.

Third Embodiment

Figure 10:
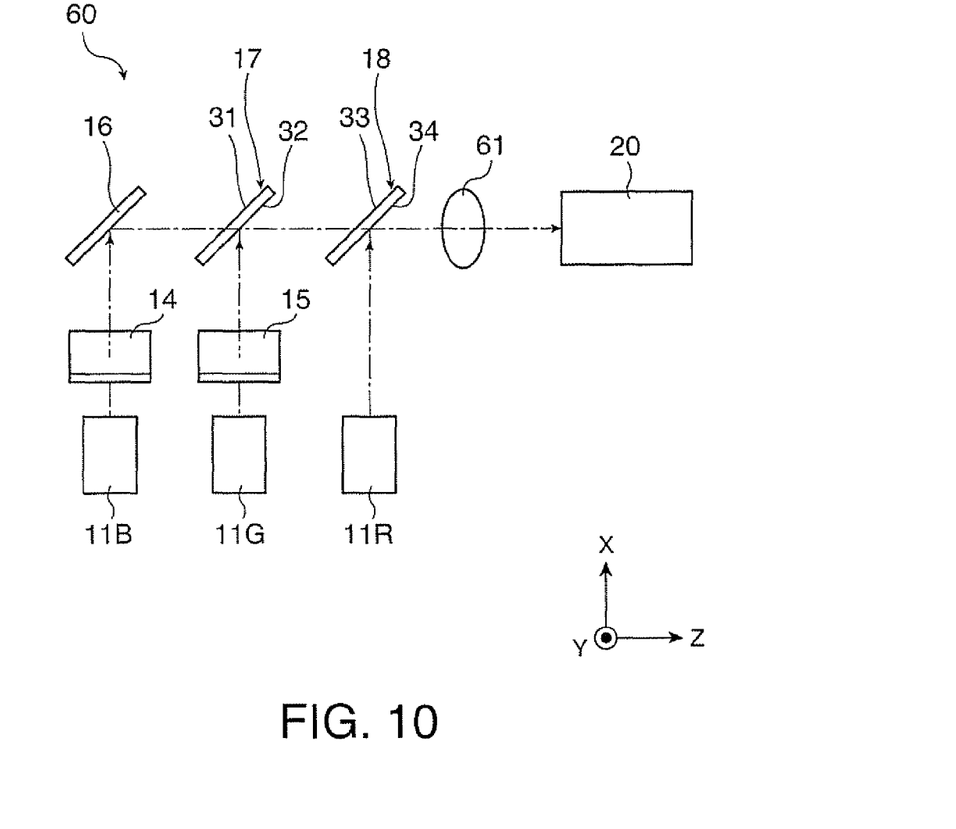
FIG. 10 is a diagram showing a top view configuration of a light source device and a scanning optical system according to a third embodiment of the invention.
Figure 11:
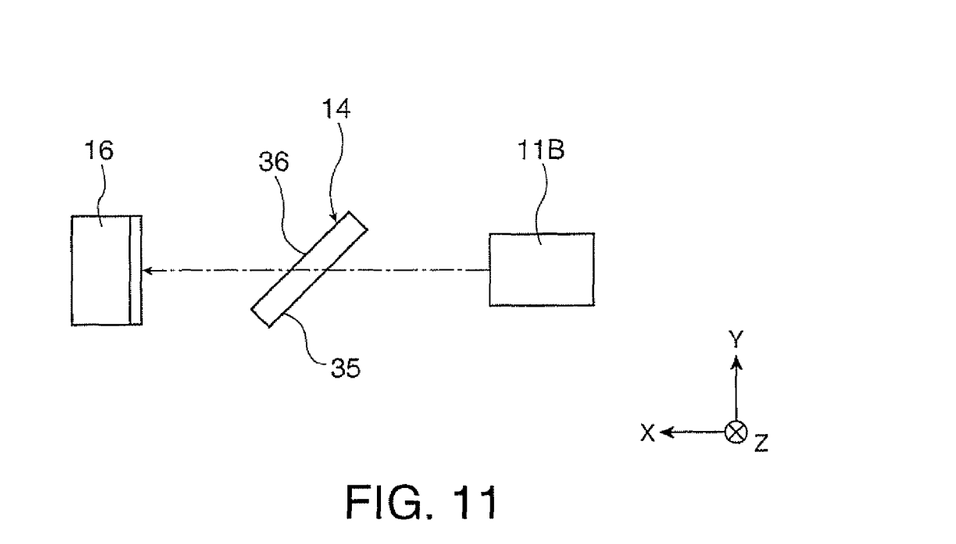
FIG. 11 is a diagram showing the side view configuration of the constituents disposed on the light path of the B light.

FIG. 10 shows a top view configuration of the light source device 60 and the scanning optical system 20 according to a third embodiment of the invention. FIG. 11 shows a side view configuration of the elements disposed on the light path from the B light semiconductor laser 11B to the B light reflecting mirror 16 in the light source device 60. The light source device 60 according to the present embodiment is applied to the image display apparatus 1 of the first embodiment described above. In the present embodiment, a converging optical system 61 disposed on the exit side of the dichroic mirror 18 functioning as the second optical element is provided. The same parts as in the first embodiment are denoted with the same reference numerals, and the duplicated explanations will be omitted. The side view configuration of the elements disposed on the light path from the G light semiconductor laser 11G to the dichroic mirror 17 in the light source device 60 is the same as the side view configuration with respect to the B light shown in FIG. 11.

The converging optical system 61 is an optical system having a collimating function and a converging function. The converging optical system 61 collimates and converges the B light, the G light, and the R light. By disposing the converging optical system 61 on the light path of the colored light beams combined into a single light beam, the colored light beams can be collimated and converged using the converging optical system 61 common to the colored light beams. Thus, the light source device 60 can emit the respective colored light beams thus collimated and converged with a small-sized and simple configuration with a small number of components. It should be noted that it is possible to separate the converging optical system 61 into a collimator optical system for collimating the light and a converging optical system for converging the light. The light source devices according to the embodiments described above are not limited to having the light source sections using the semiconductor lasers, but can also have the light source sections using diode pumped solid state (DPSS) lasers or those using wavelength conversion elements to emit laser beams with converted wavelengths. It is also possible to apply the light source devices according to the embodiments described above to electronic equipment for scanning a laser beam such as a laser printer besides the image display apparatus.

Fourth Embodiment

Figure 12:
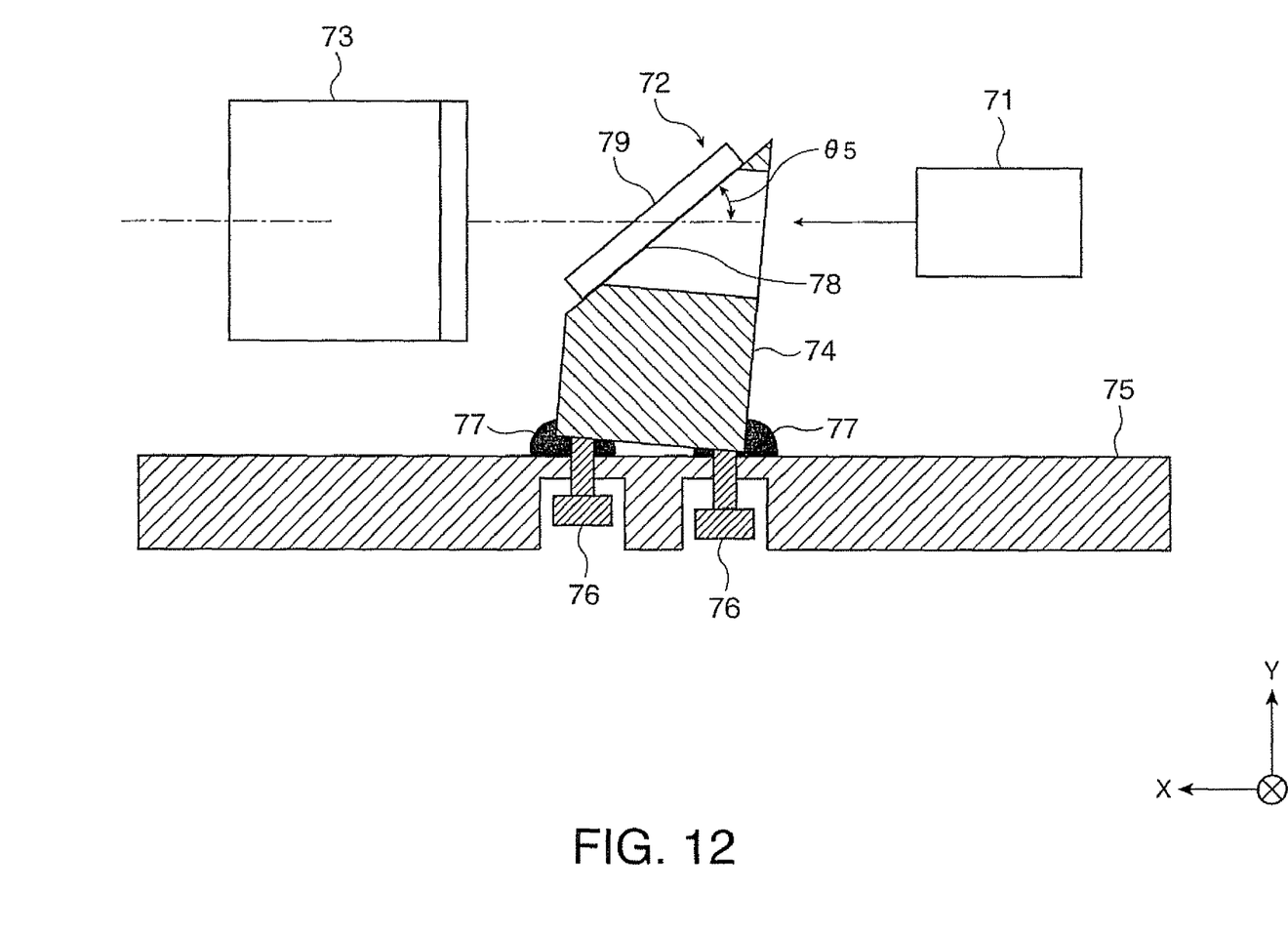
FIG. 12 is a diagram schematically showing a characterizing portion of a light source device according to a fourth embodiment of the invention.

FIG. 12 is a diagram for schematically representing a characterizing portion of the light source device according to a fourth embodiment of the invention. In the present embodiment, a holding section 74 for holding a first optical element 72 is provided. The configuration explained in the present embodiment can also be applied to the configuration of either one of the first through the third embodiments described above. In the drawing, a first optical element 72, a holding section 74, a substrate 75, a tilt adjusting section 76, and a fixing section 77 constituting the characterizing portion of the present embodiment are represented as cross-sectional views.

A semiconductor laser 71 as the light source section emits a laser beam, which is modulated in accordance with an image signal, in the X-axis direction. The first optical element 72 transmits the laser beam from the semiconductor laser 71. The first optical element 72 is provided with a first entrance surface 78 to which the laser beam is input and an exit surface 79 for emitting the laser beam. The first entrance surface 78 is tilted towards a direction rotated around a primary axis substantially parallel to the Z-axis with respect to the principal ray of the laser beam entering the first entrance surface 78. The first entrance surface 78 and the principal ray of the laser beam entering the first entrance surface 78 form an angle θ5. The second optical element 73 transmits the laser beam from the first optical element 72. A second entrance surface of the second optical element 73 to which the laser beam is input is tilted towards a direction rotated around a secondary axis substantially parallel to the Y-axis with respect to the principal ray of the laser beam entering the second entrance surface.

The holding section 74 is installed to the substrate 75. The holding section 74 is provided with a hollow for transmitting the laser beam from the semiconductor laser 71. The first optical element 72 is installed in the holding section 74 so as to cover the hollow provided to the holding section 74. The holding section 74 holds the first optical element 72, thereby defining the angle θ5. The first optical element 72 and the holding section 74 are integrated by, for example, bonding using an adhesive agent. Besides the above method, the first optical element 72 and the holding section 74 can be integrated by any method such as fitting the first optical element 72 in the holding section 74.

The tilt adjusting section 76 is provided for adjusting the tilt of the holding section 74 with respect to the substrate 75 when installing the first optical element 72. As the tilt adjusting section 76, two screws, for example, are used. The screws penetrate the substrate 75 from the side of the substrate 75 opposite to the side thereof, on which the holding section 74 is installed, to the side on which the holding section 74 is installed. The two screws are disposed so as to be arranged in the X-axis direction in the cross-sectional view shown in the drawing. The fixing section 77 fixes the holding section 74 to the substrate 75. The fixing section 77 is formed, for example, by curing ultraviolet curing resin.

Then, the adjustment of the angle θ5 when installing the first optical element 72 will hereinafter be explained. When clenching the screws forming the tilt adjusting section 76 on the substrate 75, the screws push the holding section 74 up from the substrate 75. The tilt of the holding section 74 with respect to the substrate 75 can finely be adjusted in accordance with the extent of clenching the screws. By appropriately adjusting the tilt of the holding section 74 with respect to the substrate 75, the holding section 74 holds the first optical element 72 at the angle θ5 most suitable for correcting the astigmatic difference caused in the second optical element 73.

After adjusting the tilt of the holding section 74 with respect to the substrate 75, the ultraviolet curing resin is injected between the holding section 74 and the substrate 75, and then irradiated with an ultraviolet ray, thereby curing the ultraviolet curing resin. By curing the ultraviolet curing resin, the fixing section 77 is formed between the holding section 74 and the substrate 75. The holding section 74 and the first optical element 72 thus integrated with each other are fixed to the substrate 75 by the fixing section 77. By thus fixing the first optical element 72 in the condition of forming the angle θ5 most suitable for correcting the astigmatic difference, the light source device can be provided with the configuration capable of reducing the astigmatic difference.

The holding section 74 explained in the present embodiment is suitable for holding the elements for correcting the astigmatic differences such as correcting parallel plates 14, 15 (see FIGS. 3, 4, 7, 8, and 11) or the correcting parallel plates 41, 42 (see FIG. 5). It should be noted that the tilt adjusting section 76 is not limited to the case of the two screws arranged in the X-axis direction, but can be any mechanism capable of adjusting the tilt of the holding section 74 with respect to the substrate 75. For example, the tilt adjusting section 76 can be composed of four screws. By providing the tilt adjusting section 76 at positions corresponding to the four corners of the holding section 74, the holding section 74 can stably be fixed. The fixing section 77 can also be obtained by curing resin other than the ultraviolet curing resin such as thermoset resin, or an adhesive agent.

Fifth Embodiment

Figure 13:
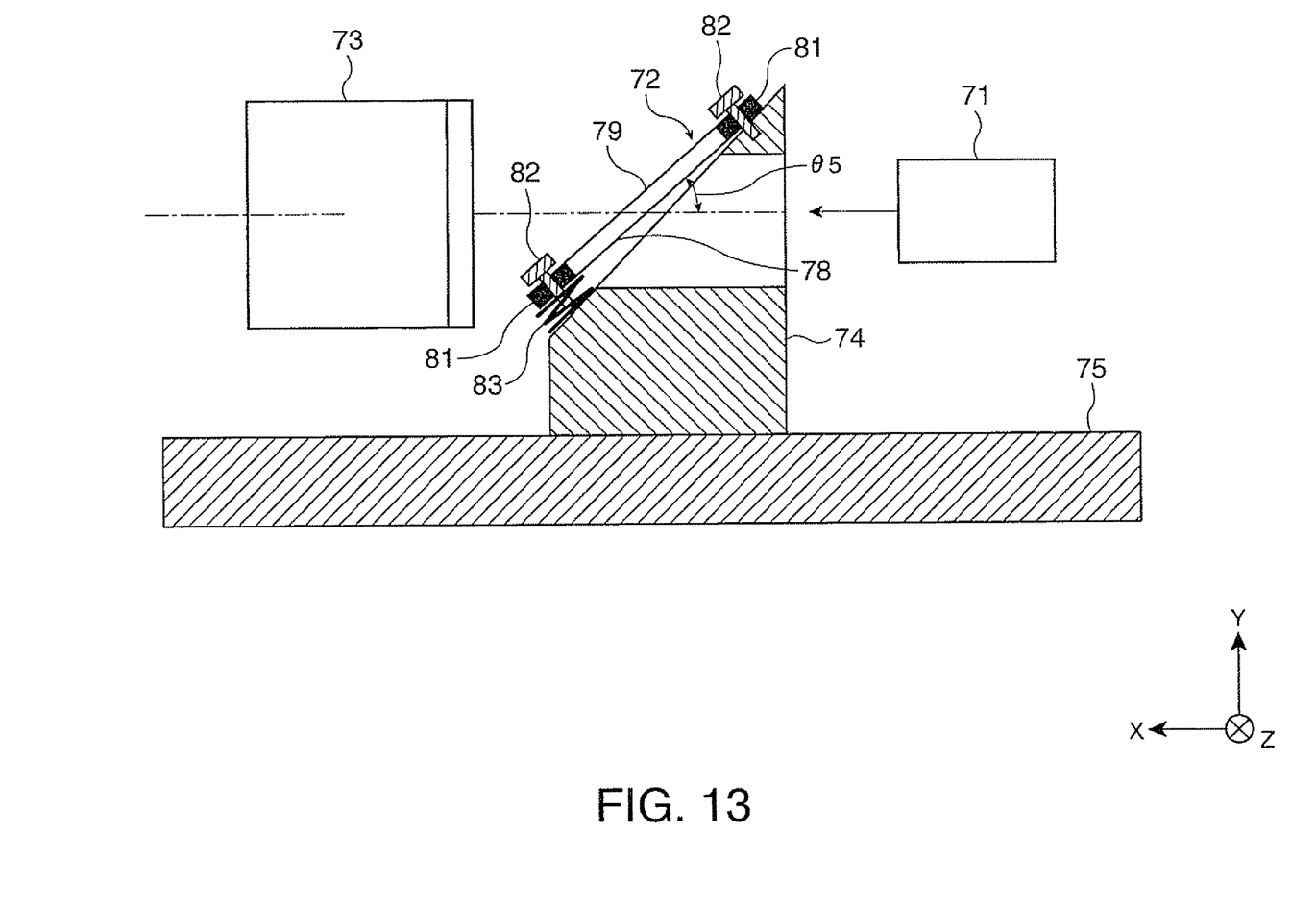
FIG. 13 is a diagram schematically showing a characterizing portion of a light source device according to a fifth embodiment of the invention.

FIG. 13 is a diagram for schematically representing a characterizing portion of the light source device according to a fifth embodiment of the invention. In the present embodiment, a tilt adjusting section 82 for adjusting the tilt of the first optical element 72 with respect to the holding section 74 is provided. The same parts as in the fourth embodiment are denoted with the same reference numerals, and the duplicated explanations will be omitted. The configuration explained in the present embodiment can also be applied to the configuration of either one of the first through the third embodiments described above. In the drawing, the first optical element 72, the holding section 74, the substrate 75, a frame member 81, the tilt adjusting section 82, and a spring 83 constituting the characterizing portion of the present embodiment are represented as cross-sectional views.

The holding section 74 is installed to the substrate 75. Besides the above, the holding section 74 and the substrate 75 can be formed of a single member. The frame member 81 is disposed on the periphery of the first optical element 72 to support the first optical element 72. The first optical element 72 and the frame member 81 are formed integrally. The tilt adjusting section 82 is provided for adjusting the tilt of the first optical element 72 with respect to the holding section 74 when installing the first optical element 72. As the tilt adjusting section 82, two screws are used, for example. The screws penetrate the frame member 81 from the side of the frame member 81, which is opposite to the holding member 74 side thereof, to the holding member 74 side. The two screws are disposed so as to be arranged in the cross-sectional view shown in the drawing. The spring 83 is disposed between the holding section 74 and the frame member 81. The spring 83 is, for example, a coil spring combined with one of the screws constituting the tilt adjusting section 82.

Then, the adjustment of the angle θ5 when installing the first optical element 72 will hereinafter be explained. When loosing the screw combined with the spring 83, the frame member 81 and the first optical element 72 are pushed up from the holding section 74 by the restoring force of the spring 83. When clenching the screw against the restoring force of the spring 83, the frame member 81 and the first optical element 72 are pressed against the holding section 74. The tilt of the first optical element 72 with respect to the holding section 74 can finely be adjusted in accordance with the extent of clenching the screws. By appropriately adjusting the tilt of the first optical element 72 with respect to the holding section 74, the holding section 74 holds the first optical element 72 at the angle θ5 most suitable for correcting the astigmatic difference caused in the second optical element 73. It should be noted that the number of springs 83 is not limited to one, but can be two or more. The spring 83 is not necessarily provided while being combined with the screw, but it is also possible that the spring 83 is disposed at any position between the holding section 74 and the frame member 81. Further, it is only required for the spring 83 to be an elastic member the restoring force of which can be used, and the spring 83 can be, for example, a leaf spring besides the coil spring.

After adjusting the tilt of the first optical element 72 with respect to the holding section 74, the ultraviolet curing resin is injected between the holding section 74 and the frame member 81, and then irradiated with an ultraviolet ray, thereby curing the ultraviolet curing resin. By curing the ultraviolet curing resin, the fixing section (not shown) is formed between the holding section 74 and the frame member 81. The frame member 81 and the first optical element 72 thus integrated with each other are fixed to the holding section 74 by the fixing section. By thus fixing the first optical element 72 in the condition of forming the angle θ5 most suitable for correcting the astigmatic difference, the light source device can be provided with the configuration capable of reducing the astigmatic difference.

The holding section 74 explained in the present embodiment is suitable for holding the elements for correcting the astigmatic differences such as correcting parallel plates 14, 15 (see FIGS. 3, 4, 7, 8, and 11) or the correcting parallel plates 41, 42 (see FIG. 5). It should be noted that the tilt adjusting section 82 is not limited to the case of the two screws, but can be any mechanism capable of adjusting the tilt of first optical element 72 with respect to the holding section 74. The tilt adjusting section 82 can be configured by, for example, four screws disposed so as to penetrate the four corners of the frame member 81. By adopting such a configuration as described above, it is possible to stably hold the tilt of the frame member 81 and the optical element 72. The fixing section can also be obtained by curing resin other than the ultraviolet curing resin such as thermoset resin, or an adhesive agent.

As described above, the light source device and the image display apparatus according to the invention are suitable for the case of displaying an image by scanning the laser beam.

The entire disclosure of Japanese Patent Application Nos. 2008-166921, filed Jun. 26, 2008 and 2009-100612, filed Apr. 17, 2009 are expressly incorporated by reference herein.

What is claimed is:

1. A light source device comprising:
   a first light source section adapted to emit a first light beam;
   a first optical element provided with a first entrance surface to which the first light beam being emitted from the first light source section is adapted to be input, the first optical element being adapted to transmit the first light beam being input to the first entrance surface; and
   a second optical element provided with a second entrance surface to which the first light beam being transmitted through the first optical element is adapted to be input, the second optical element being adapted to transmit the first light beam being input to the second entrance surface,
   wherein the first entrance surface is tilted with respect to a principal ray of the first light beam being input to the first entrance surface, such that the first entrance surface is rotated about a primary axis that is perpendicular to the principal ray of the first light beam being input to the first entrance surface, and
   the second entrance surface is tilted with respect to the principal ray of the first light beam being input to the second entrance surface, such that the second entrance surface is rotated about a secondary axis that is perpendicular to the primary axis.

2. The light source device according to claim 1, wherein the first optical element is a parallel plate adapted to transmit the first light beam input to the first entrance surface.

3. The light source device according to claim 2, wherein
the second optical element is a parallel plate adapted to transmit the first light beam input to the second entrance surface, and
a thickness of the first optical element is substantially the same as a thickness of the second optical element.

4. The light source device according to claim 2, wherein
the second optical element is a parallel plate adapted to transmit the first light beam input to the second entrance surface, and
a first angle between the first entrance surface and the principal ray is substantially the same as a second angle between the second entrance surface and the principal ray.

5. The light source device according to claim 1, further comprising:
a second light source section adapted to input a second light beam to a surface of the second optical, element opposite the second entrance surface,
wherein the second optical element transmits the first light beam being emitted from the first light source section through the first optical element, and reflects the second light beam being emitted from the second light source section and input to the surface opposite to the second entrance surface, thereby combining the first light beam and the second light beam.

6. The light source device according to claim 5, further comprising:
a converging optical system disposed on an exit side of the second optical element, and adapted to converge the first light beam and the second light beam.

7. The light source device according to claim 5, wherein
the first light beam is a first colored light beam,
the second light beam is a second colored light beam, and
the second optical element is a dichroic mirror adapted to transmit the first colored light beam and to reflect the second colored light beam.

8. The light source device according to claim 7, further comprising:
a third light source section adapted to emit a third colored light beam; and
a dichroic mirror adapted to transmit the first colored light beam and the second colored light beam, and to reflect the third colored light beam.

9. The light source device according to claim 1, further comprising:
a light detection section adapted to detect a light beam reflected on the first entrance surface,
wherein light intensity of the first light beam being emitted by the first light source section is adapted to be controlled based on a result of the detection by the light detection section.

10. The light source device according to claim 9, further comprising:
a second light source section adapted to emit a second light beam; and
a second light beam splitting section adapted to split the second light beam being emitted from the second light source section,
wherein the first light beam is adapted to be split using the first optical element, and
the second beam splitting section is provided with an entrance surface substantially perpendicular to a principal ray of the second colored light beam.

11. An image display apparatus comprising:
the light source device according to claim 1 adapted to emit a light beam; and
a scanning optical system adapted to scan the light beam being emitted from the light source device,
wherein the scanning optical system scanning the light beam is adapted to display an image.

12. The light source device according to claim 1, wherein the secondary axis is perpendicular to the principal ray of the first light beam being input to the first entrance surface.

13. A light source device comprising:
a light source section adapted to emit a light beam;
a first optical element provided with a first entrance surface to which the light beam being emitted from the light source section is adapted to be input, the first optical element being adapted to transmit the light beam being input to the first entrance surface;
a second optical element provided with a second entrance surface to which the light beam being transmitted through the first optical element is adapted to be input, the second optical element being adapted to transmit the light beam being input to the second entrance surface, and
a holding section adapted to hold the first optical element to define a first angle between the first entrance surface and a principal ray of the light beam being input to the first entrance surface,
wherein the first entrance surface is tilted with respect to the principal ray of the light beam being input to the first entrance surface, such that the first entrance surface is rotated about a primary axis that is perpendicular to the principal ray of the light beam being input to the first entrance surface, and
the second entrance surface is tilted with respect to the principal ray of the light beam being input to the second entrance surface, such that the second entrance surface is rotated about a secondary axis that is perpendicular to the primary axis.

14. The light source device according to claim 13, further comprising:
a fixing section adapted to fix the first optical element at an angle between the first entrance surface and the principal ray of the light beam being input to the first entrance surface.

15. The light source device according to claim 13, further comprising:
a substrate to which the holding section is installed; and
a tilt adjusting section adapted to adjust a tilt of the holding section with respect to the substrate.

16. The light source device according to claim 13, further comprising:
a tilt adjusting section adapted to adjust a tilt of the first optical element with respect to the holding section.

17. An image display apparatus comprising:
the light source device according to claim 13 adapted to emit a light beam; and
a scanning optical system adapted to scan the light beam emitted from the light source device,
wherein the scanning optical system scanning the light beam is adapted to display an image.

18. The light source device according to claim 13, wherein the secondary axis is perpendicular to the principal ray of the first light beam being input to the first entrance surface.

* * * * *